Patented Dec. 6, 1938

2,139,219

UNITED STATES PATENT OFFICE

2,139,219

PROCESS FOR PRODUCING TETRACHLORETHYLENE

Georg Basel and Erich Schaeffer, Burghausen, Obb., Germany, assignors to Dr. Alexander Wacker Gesellschaft fur Elektrochemische Industrie, G. m. b. H., Munich, Germany, a corporation No Drawing. Application November 21, 1936, Serial No. 112,079. In Germany December 12, 1935

6 Claims. (Cl. 260—654)

This invention relates to the production of tetrachlorethylene and has for its object to provide an efficient, economical process for this purpose.

We have discovered that it is possible to produce tetrachlorethylene on an economical commercial scale from 1,1,2,2-tetrachlorethane by passing the vapors of 1,1,2,2-tetrachlorethane over hot surfaces in admixture with chlorine; in which operation 2 mols of hydrochloric acid are split off. The reaction product contains practically no higher chlorine substitution products except that small quantities of trichlorethylene or hexachlorethane may be present.

In carrying out our process, substantially impervious bodies, such as, for instance, china or glass potsherds may serve as contacts if desired, but we prefer to use porous contact bodies such as active carbon, wood charcoal, bone charcoal, silica gel and the like, since with such porous bodies it is usually possible to operate at temperatures lower than 450° C., for instance around 300–350° C.

It is advantageous to provide or coat porous contacts with substances which promote the absorption of chlorine or the splitting up of hydrochloric acid, for instance chlorine derivatives of bivalent metals, such as copper chloride and the like. With the use of such catalysts alone or in addition to the indicated substances the temperature can be reduced to as low as 150° C. The process can be carried out effectively at atmospheric pressure as well as above or below atmospheric pressure.

The tetrachlorethylene obtained according to our process may be used for many purposes, especially as a solvent, and is particularly effective as a solvent for cleaning textiles, metals, etc.

Example I

Through a catalyst space of about 360 cub. cms., which is filled with about 185 g. of highly activated carbon or coal impregnated with 30% of copper chloride, we pass simultaneously about 2700 g. of 1,1,2,2-tetrachlorethane in the form of vapor and 765 g. of chlorine over a period of about 8 hours and a temperature of 300–320° C. There is obtained as reaction product, tetrachlorethylene together with trichlorethylene and hydrochloric acid gas.

Example II

The process is performed as in Example I, using animal or bone charcoal as a catalyst and at a temperature of 150° C. In addition to the substances indicated in the foregoing example there is also produced a small amount of hexachlorethane.

It is to be understood that various changes may be made in the process described above without departing from the scope and spirit of the invention which is to be limited only by the appended claims when interpreted in view of the prior art.

The invention claimed is:

1. Process for producing tetrachlorethylene from 1,1,2,2-tetrachlorethane, which comprises passing gaseous 1,1,2,2-tetrachlorethane and chlorine in contact with a hot surface at a temperature between 150° and 450° C.

2. Process for producing tetrachlorethylene from 1,1,2,2-tetrachlorethane, which comprises passing gaseous 1,1,2,2-tetrachlorethane and chlorine in contact with a porous substance heated to a temperature between 150° and 450° C.

3. Process for producing tetrachlorethylene from 1,1,2,2-tetrachlorethane, which comprises passing gaseous 1,1,2,2-tetrachlorethane and chlorine at a temperature between 150° and 450° C. in contact with a material capable of promoting the absorption of chlorine or the splitting up of hydrochloric acid.

4. Process for producing tetrachlorethylene from 1,1,2,2-tetrachlorethane, which comprises passing gaseous 1,1,2,2-tetrachlorethane and chlorine in contact with chlorides of divalent metals at a temperature between 150° and 450° C.

5. Process for producing tetrachlorethylene from 1,1,2,2-tetrachlorethane, which comprises passing gaseous 1,1,2,2-tetrachlorethane and chlorine in contact with a porous substance heated to a temperature between 150° and 450° C. and containing a material capable of promoting the absorption of chlorine and the splitting up of hydrochloric acid.

6. Process for producing tetrachlorethylene from 1,1,2,2-tetrachlorethane, which comprises passing gaseous 1,1,2,2-tetrachlorethane and chlorine in contact with a porous substance heated to a temperature between 150 and 450° C. and containing chlorides of divalent metals.

GEORG BASEL.
ERICH SCHAEFFER.